(12) United States Patent
Chraplyvy

(10) Patent No.: US 6,363,181 B1
(45) Date of Patent: Mar. 26, 2002

(54) METHOD AND APPARATUS FOR WAVELENGTH-DIVISION MULTIPLEXING

(75) Inventor: Andrew Roman Chraplyvy, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,862

(22) Filed: Sep. 15, 1999

(51) Int. Cl.[7] .................................................. G02B 6/26
(52) U.S. Cl. .............................. 385/15; 385/16; 385/17; 385/18; 385/19
(58) Field of Search ............................. 385/15, 16, 17, 385/18, 19, 20, 11, 14, 24, 43; 359/157, 183, 180, 187; 372/6, 21

(56) References Cited

U.S. PATENT DOCUMENTS

| 5,365,362 A | * | 11/1994 | Gnauck et al. | ............. 359/174 |
| 5,400,164 A | * | 3/1995 | Kurtzke et al. | ............. 359/156 |
| 5,444,725 A | * | 8/1995 | Zirngibl | ....................... 372/20 |
| 5,719,696 A | * | 2/1998 | Chraplyvy et al. | ......... 359/341 |

OTHER PUBLICATIONS

Bergano, Neal S. et al, "320 Gb/s WDM Transmission (64×5 Gb/s) over 7,2000 km using Large Mode Fiber Spans and Chirped Return–to–Zero Signals", Tyco Submarine Systems Ltd., pp. PD12–1, PD12–4.

Tkach, R. W., et al, "Four–Photon Mixing and High–Speed WDM Systems", Journal of Lightwave Technology, vol. 13, No. 5, May 1995, pp. 841–849.

* cited by examiner

*Primary Examiner*—Mohammad Sikder
(74) *Attorney, Agent, or Firm*—Schnader Harrison Segal & Lewis LLP

(57) ABSTRACT

An apparatus and method for wavelength-division multiplexing employing an arrayed waveguide router and polarization-maintaining input fibers for coupling channels which experience four photon mixing to the router. The invention is useful in extremely dense wavelength-division multiplexing to reduce optical non-linearity.

2 Claims, 2 Drawing Sheets

METHOD AND APPARATUS FOR WAVELENGTH-DIVISION MULTIPLEXING

FIELD OF THE INVENTION

This invention relates to an method and apparatus for wavelength-division multiplexing, particularly to extremely dense wavelength division multiplexing in a high capacity optical fiber communication system.

DESCRIPTION OF THE PRIOR ART

Wavelength division multiplexing (WDM) in an optical fiber communication system is a means for achieving increased information capacity by combining a number of channels in parallel in the same fiber. WDM provides high information capacities in a single fiber by combining a number of lower bit-rate channels. This reduces the requirement for high bit-rate transmitters, receivers and electronics.

The number of channels in a WDM system can be increased by reducing the channel spacing, or by increasing the system's useable bandwidth. However, this can lead to increased transmission impairments that limit the application of WDM in communication systems. One fundamental limitation for very dense WDM transmission is optical nonlinearity. In particular, four photon mixing (FPM) nonlinearity, also known as "four wave mixing," can cause cross-talk between channels and excess attenuation or power loss. FPM appears as a fluctuating gain or loss due to constructive and destructive interference entailing signals of different channels. Thus, when more than one optical signal propagates in a fiber, FPM products are generated which can interfere with the information-bearing optical signals. These disadvantages associated with FPM have been described in "four-proton mixing and high-speed WDM systems" by R. W. Tkach, A. R. Chraplyvy, F. Forghieri, A. H. Gnauck, and R. M. Derosier, *Journal of Light Wave Technology*, May 1995, pp. 841–849.

FPM nonlinearity can be particularly severe in systems with equal channel spacing and in fiber with low dispersion such as dispersion-shifted fiber or TrueWave fiber near the low-dispersion end of the specifications. This problem has been observed in systems in which the short wavelength signals nearest the zero dispersion wavelength experience FPM degradation. FPM has also been observed where an attempt is made to increase bandwidth on existing fiber such that transmissions are made outside of the specified optimum bandwidth in which dispersion is lowest. Waveform distortions increase for those channels located far from the system's zero dispersion wavelength. Waveform distortions also increase as the spacing between channels decreases.

Some efforts have been made to address the transmission impairments caused by FPM nonlinearity. The prior art discloses that orthogonal polarization launch can reduce the nonlinear channel interactions from FPM. This result was observed in a 320 Gb/s 64 channel transmission experiment using a 512 km amplifier chain in a circulating loop. Sixty four CW lasers were tuned on a 0.3 nm grid from 1540.6 nm to 1559.5 nm. The odd and even wavelengths were combined separately in a series of directional couplers. Each set of wavelengths first passed through an amplitude modulator, then through an amplitude and a phase modulator driven by a 5 GHz. sinusoidal clock. The transmitter generated 105 psec raised cosine pulses with the optical phase modulation adjusted to give maximum chirp aligned with the center of the pulse. The odd and even channels were then combined in a polarization dependent coupler.

One problem with this approach is that it is expensive to implement. It relies on the use of costly combiners and directional couplers to combine the orthogonally polarized channels. Another problem is that the combiners are physically large, making it difficult to implement them in existing WDM systems.

SUMMARY OF THE INVENTION

According to the invention there is provided an inexpensive and compact method of reducing the negative effects of four photon mixing in a wavelength division multiplex optical communications system comprising the steps of providing an arrayed waveguide router, and coupling channels which experience four photon mixing to said router using polarization-maintaining input fibers.

The invention also provides an inexpensive and compact apparatus for reducing the negative effects of four photon mixing in a wavelength division multiplex optical communications system, the apparatus comprising an arrayed waveguide router, and a plurality of input fibers, wherein one or more of said fibers are polarization-maintaining input fibers for coupling short wavelength channels to said router.

DETAILED DESCRIPTION OF THE INVENTION

The invention reduces degradation from four photon mixing (FPM) in extremely dense wavelength division multiplex optical communication systems by an order of magnitude. This substantial reduction in nonlinear impairments is accomplished without requiring major system redesign. The invention utilizes an arrayed waveguide router with polarization-maintaining (PM) input fibers. Use of PM fibers provides reduced degradation of channel orthogonality over the transmission line. The adjacent channels are launched with orthogonal polarizations. The FPM products generated by orthogonally polarized signals and using PM input fibers are smaller by up to an order of magnitude as compared to those generated by aligned polarized signals.

Figure 1:
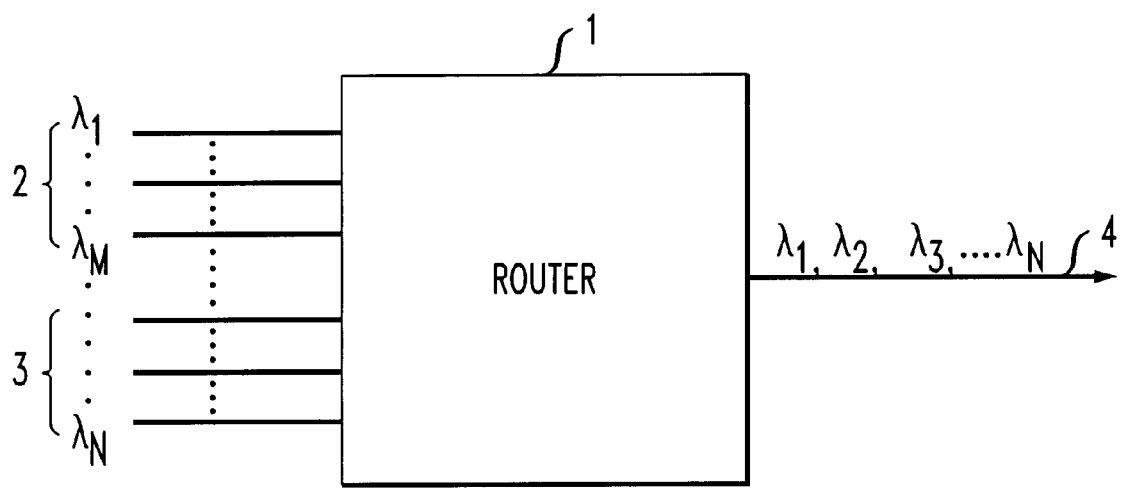
FIG. 1 schematically illustrates one embodiment of the invention.

FIG. 1 shows one embodiment of the invention having a router 1 with PM input fibers 2, non-PM input fibers 3, and output 4 (where N=number of channels; M=the number of PM input fibers and M≦N). In this embodiment not all of the input fibers need to be PM fibers. This embodiment is preferably employed where unacceptable FPM distortion is found in only some of the channels. This occurs when the source of distortion is the use of channels located outside of a fiber's optimal bandwidth. These types of distortion are typically found in the short-wavelength (between 1530 and 1540 nm) channels. Those channels experiencing four-photon mixing are coupled to the router 1 via PM fibers 2. The remaining channels can be coupled to the router via non-PM or conventional fibers 3. PM fibers may be any commercially available generally known or used in the art.

Figure 2:
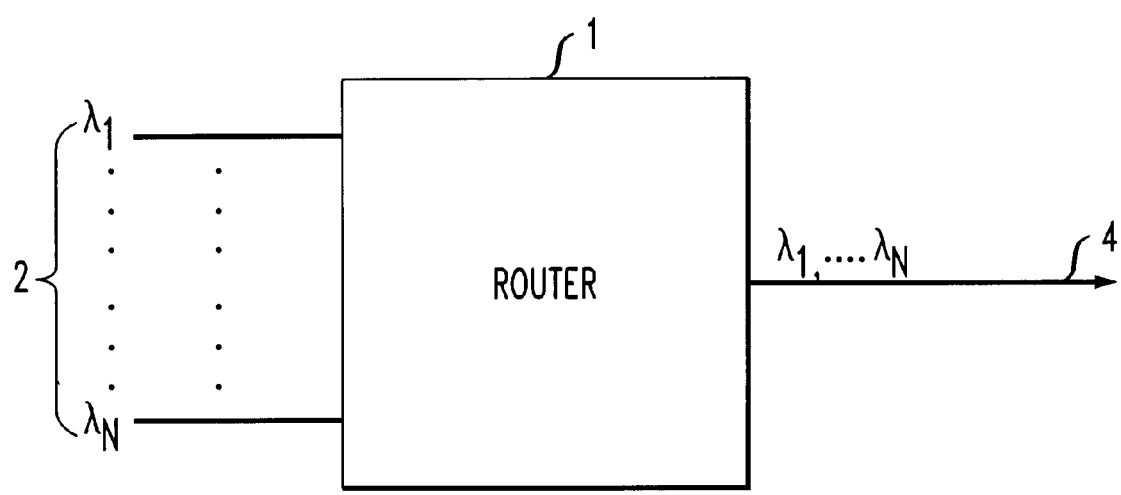
FIG. 2 schematically illustrates another embodiment of the invention.

The invention can be applied to WDM systems where distortion is found in all channels, as happens when the cause of the distortion is small spacing between channels. FIG. 2 shows an other embodiment of the invention for a system having channel spacing of smaller than about 50 GHz (where N=the number of PM input fibers). The claimed invention can also be applied to extremely dense WDM systems having channel spacing in the range of about 25–50 GHz. In this embodiment, all channels are coupled to the router 1 via PM input fibers 2.

Figure 3:
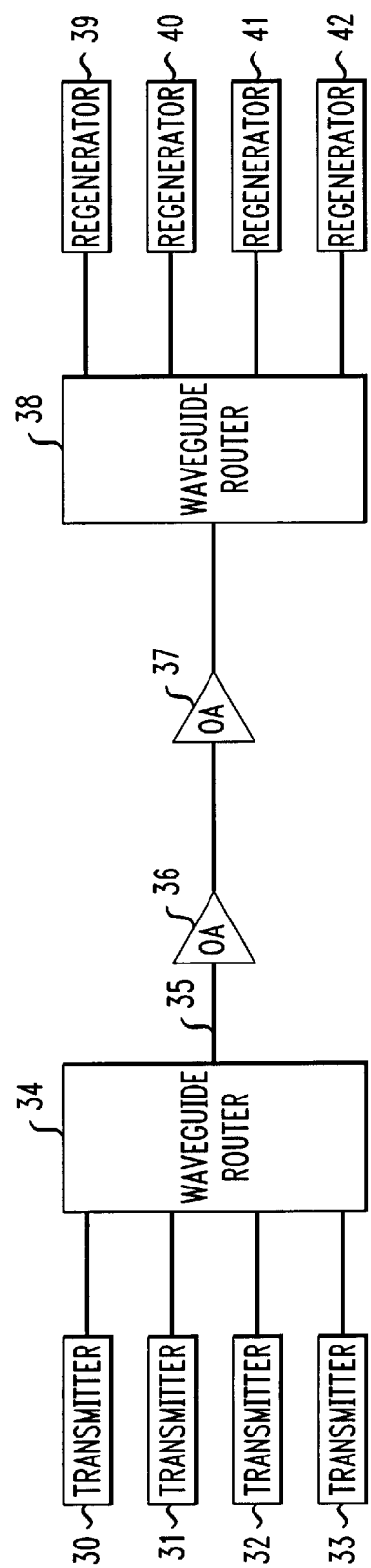
FIG. 3 is a schematic drawing of a WDM system which contains one embodiment of the invention.

FIG. 3 shows an exemplary use of the invention in a simplified WDM system. It consists of four transmitters 30–33, combined in a waveguide router 34. The combined signal is introduced into fiber transmission line 35 which is provided with optical amplifiers 36 and 37. At the receiving end the four channels are split by waveguide router 38, after which the separated signals are routed to the four regenerators 39–42. More sophisticated WDM systems may contain eight or more channels, as well as additional equipment such as polarization controllers, amplitude modulators, polarizing beam splitters, bandpass filters and the like. The invention operates in these systems as well.

Although the invention has been described in its preferred embodiments with reference to the accompanying drawings, it can be readily understood that the invention is not restricted to the preferred embodiments and that various changes and modifications can be made by those skilled in the art without departing from the spirit and scope of the invention.

What is claimed is:

1. Apparatus for wavelength-division multiplexing comprising:

an arrayed waveguide router, and a plurality of input fibers, wherein one or more of said fibers are polarization-maintaining input fibers for coupling channels which experience four photon mixing to said router.

2. The apparatus of claim 1, wherein all of said plurality of input fibers are polarization-maintaining input fibers for coupling channels which experience four photon mixing to said router.

* * * * *